United States Patent [19]

Borenstein et al.

[11] Patent Number: 5,687,849

[45] Date of Patent: Nov. 18, 1997

[54] TEST TUBE CASSETTE FOR ACCOMMODATING DIFFERENT TUBE SIZES

[75] Inventors: David Borenstein, Miami; Kyriakos Christou, Miami Lakes; Nicholas Parker, Sunrise; John K. Sieh, Miami, all of Fla.

[73] Assignee: Coulter International Corp., Miami, Fla.

[21] Appl. No.: 636,429

[22] Filed: Apr. 23, 1996

[51] Int. Cl.$^6$ .................................................. B65D 85/20
[52] U.S. Cl. ............................ 206/446; 206/480; 206/443
[58] Field of Search ............................ 206/446, 480, 206/443, 478, 485; 211/70.6; 422/104, 99

[56] References Cited

U.S. PATENT DOCUMENTS

| | | | |
|---|---|---|---|
| 539,720 | 5/1895 | Bischoff | 206/480 |
| 2,541,828 | 2/1951 | Peck | 206/480 |
| 3,276,574 | 10/1966 | Meyers | 206/327 |
| 4,534,465 | 8/1985 | Rothermel et al. | |
| 4,944,924 | 7/1990 | Mewhirt et al. | 206/446 |
| 5,137,693 | 8/1992 | Mawhirt | 206/446 |
| 5,429,243 | 7/1995 | Woelk et al. | 206/443 |
| 5,456,887 | 10/1995 | Calvo et al. | |

FOREIGN PATENT DOCUMENTS

| | | | |
|---|---|---|---|
| 687052 | 12/1929 | France | 206/327 |
| WO 94/24017 | 10/1994 | WIPO | 206/327 |

*Primary Examiner*—Paul T. Sewell
*Assistant Examiner*—Nhan T. Lam
*Attorney, Agent, or Firm*—Warren W. Kurz

[57] ABSTRACT

A cassette for supporting a plurality of cylindrically-shaped containers (e.g., test tubes) of randomly varying diameters in spaced parallel relationship includes a frame supporting a plurality of tube centering assemblies in side-by-side relationship. Each tube-centering assembly comprises a housing defining a through opening for receiving a container, and a pair of cooperating collar members slidably mounted on the housing for movement towards and away from each other. Each of the collar members has an arcuate surface adapted to contact a side wall of a received container during the sliding movement thereof. A spring is provided to bias the collar members towards each other and towards engagement with the side wall of a received container, whereby the collar members cooperate in supporting a received container therebetween.

10 Claims, 4 Drawing Sheets

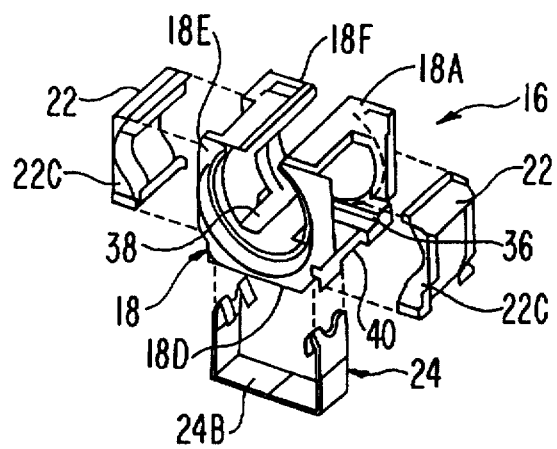
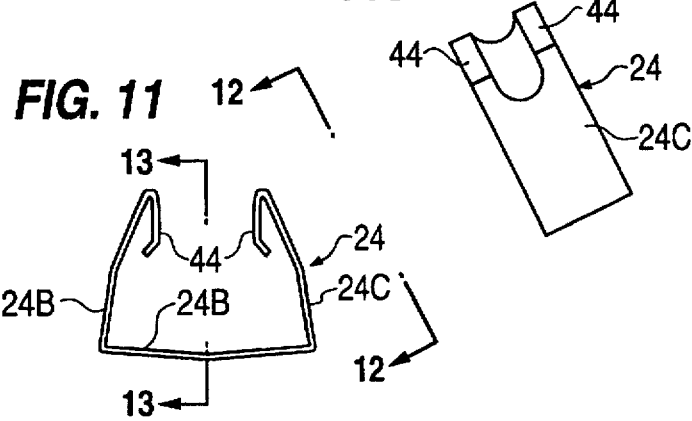
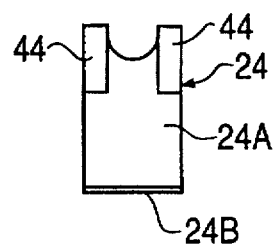
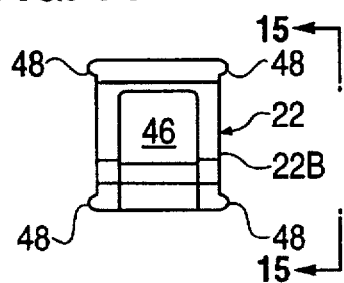
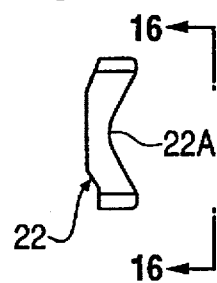
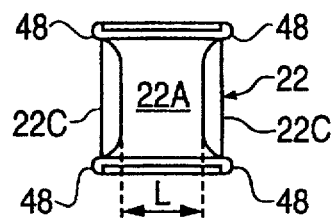

TEST TUBE CASSETTE FOR ACCOMMODATING DIFFERENT TUBE SIZES

BACKGROUND OF THE INVENTION

1. Field of the Invention

The present invention relates to improvements in cassettes for supporting a plurality of cylindrically-shaped containers, such as test tubes and the like, having different diameters and/or lengths.

2. Discussion of the Prior Art

In the commonly assigned U.S. Pat. No. 4,534,465 issued to W. F. Rothermel et al., there is disclosed a stackable test tube cassette or rack which is adapted for use in an automated blood analyzer for presenting a plurality of blood samples for analysis. This tube cassette comprises a rectangular frame which defines a plurality of parallel compartments or channels, arranged side-by-side in a linear array. Each channel is adapted to receive a test tube, and a flexible plate in each channel serves to engage and bias each received tube in a common direction, such as towards the front wall or edge of the frame. While being advantageous from the standpoint that the cassette is capable of accommodating and supporting test tubes of differing diameter (within a predefined range), this particular cassette is disadvantageous from the standpoint that the respective centers of the tubes of different diameters are not aligned in a common plane. Moreover, because of the type of spring biasing (i.e. the flexible plate) used to secure and bias the tubes in their respective compartment, there can be a tendency for the tubes to tip with respect to the axis of its associated compartment and thereby cause misalignment of the tube with respect to an automated blood aspirator forming part of the blood analyzer.

Another prior art tube cassette designed to accommodate test tubes of differing diameter is that sold by Coulter Corporation for use with its MAXM (registered trademark) blood analyzer. This cassette comprises a rectangular frame defining a plurality of parallel tube compartments, and a like plurality of tube-holding assemblies, each being releasably connected via a snap-together coupling between the front and rear walls of the individual compartments. Each tube-holding assembly includes a housing having a generally cylindrical opening for receiving a tube, and a plurality of internal metal fingers or leaf springs extending outwardly from one side of the cylinder-defining wall for urging a received tube into contact with a pair of rigid pads located on the opposite side of the cylinder-defining wall. Like the above-noted tube cassette, this particular tube is disadvantageous in that it does not operate to locate the respective longitudinal axes of tubes of differing diameter in a common plane. While the metal fingers and pads arrangement is effective to retain a tube and maintain substantial parallel alignment with the compartment axis, there is a tendency for the metal fingers to bend, break or become fatigued, the result being a loosening of the grip on a received container, allowing it to slide axially, or to tip to one side. Further, there is a tendency for the metal fingers to scrape and thereby damage bar-coded labels used on the tubes, e.g., for patient identification purposes.

SUMMARY OF THE INVENTION

In view of the foregoing discussion, an object of this invention is to provide an improved cassette of the above type, one that is improved from the standpoints that (a) it functions to support a plurality of containers of differing diameters such that their respective longitudinal axes are parallel to each other, equally spaced apart and located in a common plane, and (b) the container-engaging components of the cassette are robust in construction and thus less prone to breakage, fatigue and/or failure.

The container cassette of the invention basically comprises a frame which supports a plurality of tube centering assemblies in side-by-side relationship. Each centering assembly comprises a housing defining a through opening for receiving a container, and a pair of cooperating collar members slidably mounted on the frame for movement towards and away from each other. Each of the collar members has an arcuate surface which, during movement of its associated collar member, is adapted to contact a side wall of a received container. A spring clip serves to both retain the collar members in the housing and to bias the collar members towards each other and towards engagement with the side wall of a received container, whereby the collar members cooperate in supporting containers of differing diameter positioned therebetween. Preferably, the collar members are made of an adhesive plastic material, whereby relative sliding movement between the container wall and the collar does not degrade any label or other information carried by the exterior container side wall.

The advantages of the invention will be better appreciated from the ensuing detailed description of preferred embodiments, reference being made to the accompanying drawings in which like reference characters denote like parts.

BRIEF DESCRIPTION OF THE DRAWINGS

FIG. 10 is an exploded view of a preferred container-centering assembly;

FIGS. 11–13 are front and side views of a preferred spring clip used for biasing the container-engaging components of the container-centering assembly, the side views of FIGS. 12 and 13 being viewed from the directions 12—12 and 13—13, shown in FIG. 11; and FIGS. 14–16 are rear, side and front views, respectively, of a preferred collar member of the container-centering assembly of the FIG. 2 cassette, the side and front elevations of FIGS. 15 and 16 being viewed from the directions 15—15 and 16—16, respectively.

DETAILED DESCRIPTION OF A PREFERRED EMBODIMENT

Figure 1:
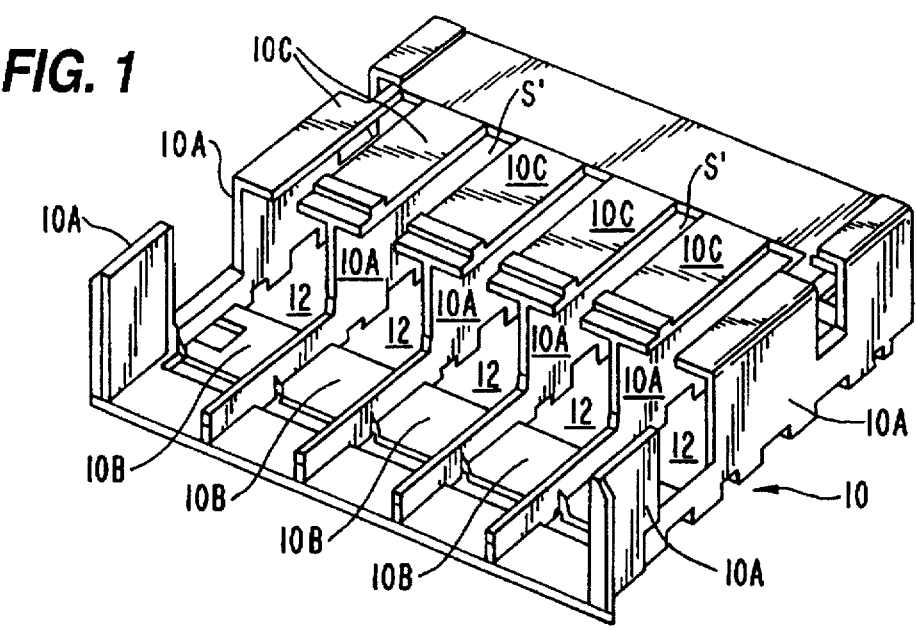
FIG. 1 is a perspective view of a preferred cassette frame for receiving a plurality of containers.

Referring now to the drawings, FIG. 1 illustrates a cassette frame 10 of generally rectangular configuration. Frame 10 is of the type used in the aforementioned tube cassette manufactured and sold by Coulter Corporation for use in its MAXM blood analyzer. Frame 10 comprises a plurality of mutually perpendicular wall portions 10A, 10B and 10C, which collectively define a plurality of open-ended rectangular compartments 12, each compartment being adapted to at least partially surround, and thereby protect, an elongated cylindrical container, for example, a tube or vial containing a blood sample.

Figure 2:
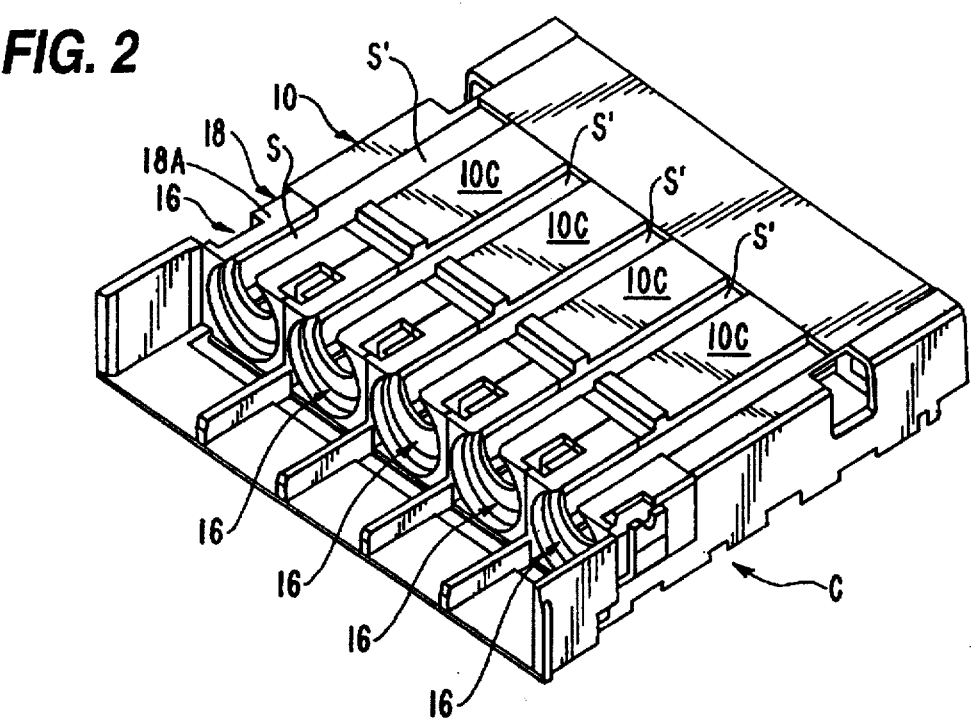
FIG. 2 is a perspective view of the FIG. 1 frame supporting a plurality of container-centering assemblies structured in accordance with a preferred embodiment of the invention.
Figure 3:
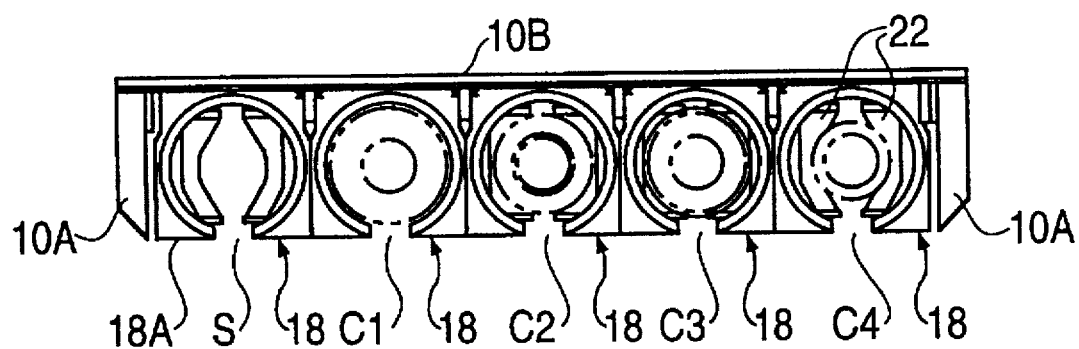
FIGS. 3 and 4 are top and side views, respectively, of the cassette shown in FIG. 2.
Figure 4:
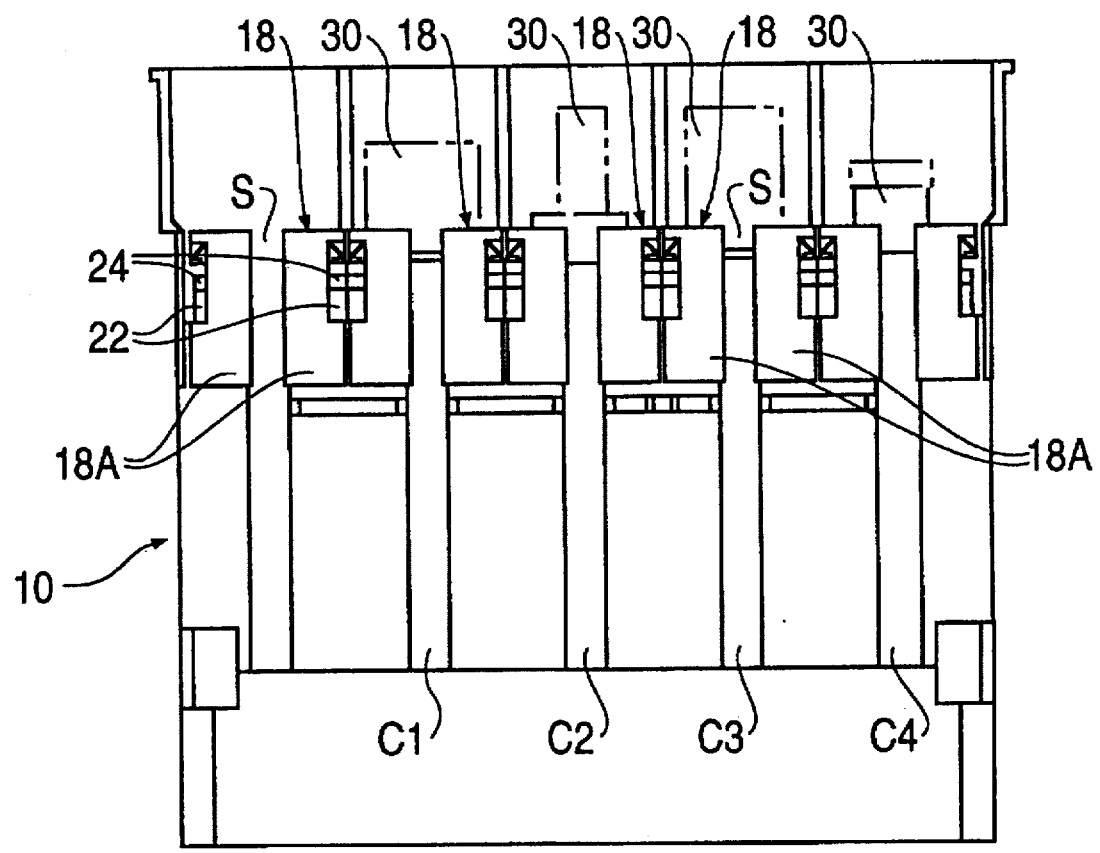

In FIG. 2, the frame of FIG. 1 has been augmented by the provision of a plurality of container-centering assemblies 16, the respective structures of which are best shown in exploded view of FIG. 10. Each of such assemblies is mounted at the entrance of one of the frame compartments 12 and, in operation, functions to align the longitudinal axis of a cylindrical container which it supports with the central axis of the compartment in which it is positioned. Each container-centering assembly comprises a housing 18 defining a circular opening 20 (see FIG. 6), a pair of collar member 22 slidably mounted on the housing, and a spring clip 24 which functions to bias the collar members towards each other so as to cause such members to cooperate in holding a container therebetween. Housings 18 have a generally U-shaped cross-section, whereby a slot S is defined in the front wall 18A of the housing. Each slot S is aligned with a similarly dimensioned slot S' formed in the front wall 10C of the cassette frame, thereby providing a viewing slot for observing a container supported in the cassette. In FIGS. 3 and 4, the cassette of the invention is shown as supporting four different types of containers C1–C4. The containers shown are test tubes of varying length, having respective diameters which vary from 10.25 mm (container C4) to 15 mm (container C1). Each tube is provided with a cap 30 which is pierceable by an aspirating needle or cannula forming part of the blood analyzing instrument in which the cassette is used.

Figure 5:
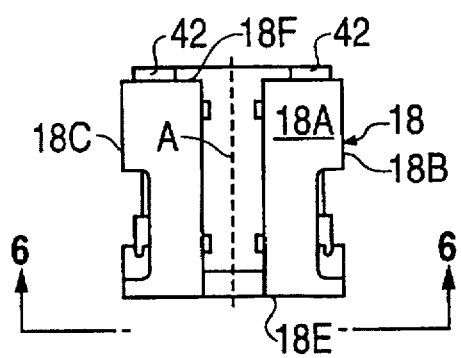
Figure 6:
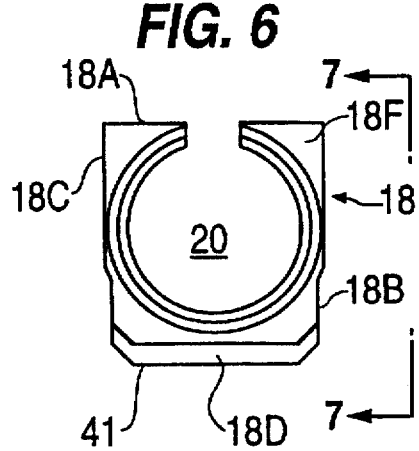
FIGS. 6–7 are front, top and side views of one of the container-centering assembly housings of the FIG. 2 cassette.
Figure 7:
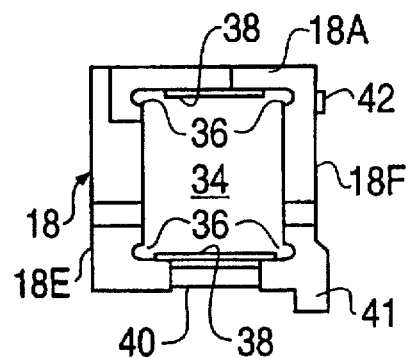

Referring to FIGS. 5–7 wherein the structural details of housing 18 are best shown, the housing's side walls 18B and 18C are provided with generally rectangular openings 34 (FIG. 7) which communicate to define an opening through the housing which is perpendicular to the circular opening 20. A pair of opposing tracks 36 are formed in the interior of the housing's top and bottom walls 18E, 18F to receive collar members 22 (shown in FIGS. 14–16). The collar members are allowed to slide along tracks 36 for a limited distance towards the interior of the housing until a pair of stops 38, centrally-located in the housing on the interior sides of the housing's front and rear walls 18A, 18D, is encountered. The outer surface of the housing's rear wall 18D is provided with a notch 40 for receiving and properly locating the base portion 24B of the spring clip 24. A rib 41 extending along the base of the rear wall 18D and a pair of tabs 42 extending outwardly from the bottom of the front wall provide structure by which the housing is snap fitted to the cassette frame. Housing 18, like collar members 22 and frame 10, are preferably made of injection-molded plastic.

In FIGS. 11–13, a preferred spring clip 24 is shown for urging the collar members together so as to capture the side walls of a container positioned therebetween. Clip 24 comprises a generally U-shaped metal leaf spring having a base portion 24B and a pair of leg portions 24A and 24C. As noted above, the spring base is positioned by a notch 40 in the outer surface of housing wall 18D. The distal end of each leg 24A of the spring clip is forked to form a pair of tabs prongs which are bent to provide a spring force in the direction of the rear side of each collar member 22.

Referring to FIGS. 14–16, each of the collar members 22 is shown to comprise a generally rectangular structure having an arcuate front surface 22A for engaging the arcuate sides of cylindrical containers. The shape of surface 22A is selected to be compatible with the various radii of curvature characteristic of containers of different diameter. The length L of surface 22A is preferably at least about 8 mm, whereby the container is supported over a sufficient distance that its axis can be maintained parallel to the housing's axis. The rear wall 22B of member 22 is provided with a notch 46 for receiving the prongs 44 of spring clip 24. Member 22 defines four tabs 48 at each of its corners, such tabs cooperating with the tracks 36 in housing 18 to guide the sliding movement of the collars in the housing. Though not shown, the top and bottom edges 22c of each collar, as considered from the direction in which a container entering the cassette first contacts the collar members, are beveled, i.e., slanted back, to facilitate receipt of the bottom of the container as it is placed into the cassette.

Figure 8:
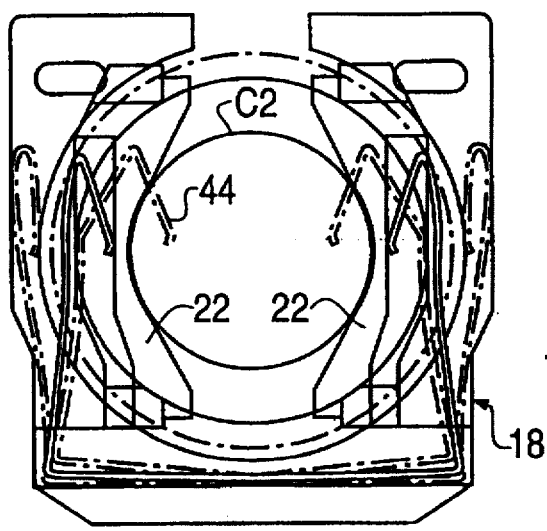
FIGS. 8 and 9 are top views of a preferred container-centering assembly showing different positions of a spring clip forming a pan thereof.
Figure 9:
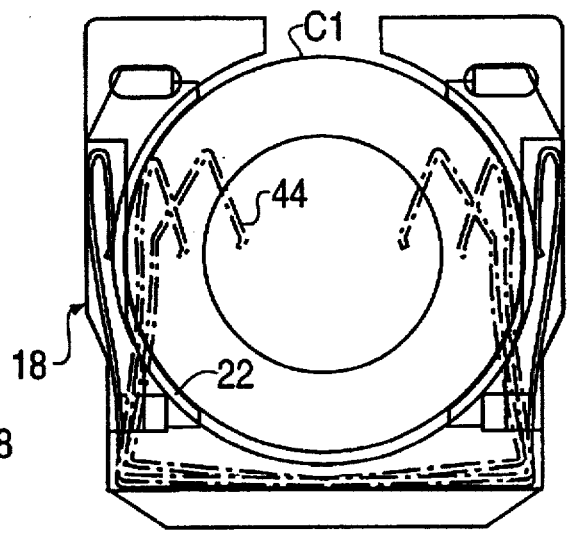

In FIGS. 8 and 9, collar members 22 are shown in two different positions to capture containers C1 and C2 of different diameters. Important to note is that the container center does not change position with respect to the housing 18, regardless of the container diameter. This feature facilitates aspiration of the contained liquid by the utilization instrument. Moreover, because the length L of the arcuate surface 22A, all of the containers will be supported with their respective longitudinal axes parallel to each other.

While the invention has been described with reference to particularly preferred embodiments, it will be apparent to those skilled in the art that modifications can be made without departing from the spirit of the invention. Such modifications, including those that embody functional equivalents of the components described above, are intended to fall within the scope of the appended claims.

What is claimed is:

1. A cassette for supporting a plurality of cylindrically-shaped containers of randomly varying diameters in spaced parallel relationship, said cassette comprising:

a frame supporting a plurality of container-centering assemblies in side-by-side relationship, each of said container-centering assemblies being adapted to support a cylindrically-shaped container and to locate the longitudinal axis of such container at a desired location on said frame, each of said assemblies comprising (i) a housing defining a through opening for receiving a container, (ii) a pair of cooperating collar members slidably mounted on said frame for sliding movement toward and away from each other, said collar members having respective arcuate surfaces adapted to contact a side wall of a received container during the sliding movement thereof, and (iii) biasing means for biasing said collar members towards each other and towards engagement with the side wall of said container, whereby the respective arcuate surfaces of said collar members cooperate in supporting a container positioned therebetween.

2. The cassette as defined by claim 1 wherein said housing is adapted to be releasably attached to said frame.

3. The cassette as defined by claim 1 wherein said biasing means comprises a leaf spring.

4. The cassette as defined by claim 3 wherein said leaf spring has a generally U-shaped configuration comprising a pair of leg members attached to a common base, and wherein said spring is arranged so that each leg member urges one of said collar members towards engagement with the wall of a received container.

5. The cassette as defined by claim 4 wherein each leg member has a projection which is adapted to engage and be retained by structure on the collar member towards which it is urged.

6. The cassette as defined by claim 4 wherein said common base is arranged along an exterior wall of said housing.

7. The cassette as defined by claim 1 wherein said frame defines a plurality of spaced chambers which at least partially surround and thereby physically protect containers supported by said container-centering assemblies.

8. The cassette as defined by claim 1 wherein said frame, housing and collar members are made of plastic.

9. The cassette as defined by claim 1 wherein said collar members are of substantially identical shape.

10. The cassette as defined in claim 1 wherein said arcuate surfaces of said collar members are adapted so as to engage a container along a substantial portion of its length whereby the respective longitudinal axes of the containers can remain parallel to each other within the frame.

* * * * *